United States Patent [19]
Kato et al.

[11] Patent Number: 5,201,535
[45] Date of Patent: Apr. 13, 1993

[54] FOLDING STROLLER WITH DETACHABLE SEAT

[75] Inventors: Hitoshi Kato; Yuichi Arai, both of Tokyo, Japan

[73] Assignee: Combi Corporation, Tokyo, Japan

[21] Appl. No.: 775,535

[22] Filed: Oct. 15, 1991

[30] Foreign Application Priority Data

Oct. 16, 1990 [JP] Japan ................. 2-276883

[51] Int. Cl.⁵ ........................... B62B 7/06; B62B 9/12
[52] U.S. Cl. .................................... 280/30; 280/643; 280/648; 280/650; 280/658; 297/130; 297/183; 297/229; 297/379
[58] Field of Search ................... 280/30, 47.38, 47.4, 280/642, 643, 644, 648, 649, 650, 658, 641, 647, 47.371; 297/130, 183, 229, 364, 365, 487, 488

[56] References Cited

U.S. PATENT DOCUMENTS

| | | | |
|---|---|---|---|
| 2,982,562 | 5/1961 | Gladstein | 280/648 |
| 3,100,651 | 8/1963 | Reese | 280/30 |
| 3,290,050 | 12/1966 | Ezquerra | 280/30 |
| 3,330,575 | 7/1967 | Boudreau | 280/648 |
| 3,784,252 | 1/1974 | Peterson | 297/379 X |
| 4,072,318 | 2/1978 | Laune | 280/650 X |
| 4,378,946 | 4/1983 | Voytko et al. | 280/642 |
| 4,412,688 | 11/1983 | Giordani | 280/650 X |
| 4,428,598 | 1/1984 | Kassai | 280/650 X |
| 4,478,427 | 10/1984 | Hyde et al. | 280/642 |
| 4,606,550 | 8/1986 | Cone | 280/642 |
| 4,762,364 | 8/1988 | Young | 297/364 X |
| 4,815,764 | 3/1989 | Carpenter | 280/650 X |
| 5,004,253 | 4/1991 | Nakao et al. | 280/648 X |
| 5,074,575 | 12/1991 | Bigo | 280/642 |

FOREIGN PATENT DOCUMENTS

| | | |
|---|---|---|
| 0233133 | 8/1987 | European Pat. Off. . |
| 2510060 | 1/1983 | France . |
| 2648102 | 12/1990 | France . |
| 2091171 | 7/1982 | United Kingdom ........... 280/650 |

Primary Examiner—Brian Johnson
Attorney, Agent, or Firm—Sughrue, Mion, Zinn, Macpeak & Seas

[57] ABSTRACT

A stroller with a releasable seat, having a reclining backrest. The seat is releasably attachable to a stroller body. When not attached to the stroller body, the seat may be utilized as a carrier by virtue of an integral carrying strap. Either a leg guard or a leg cover may be attached to the seat for protection of the baby's legs.

10 Claims, 16 Drawing Sheets

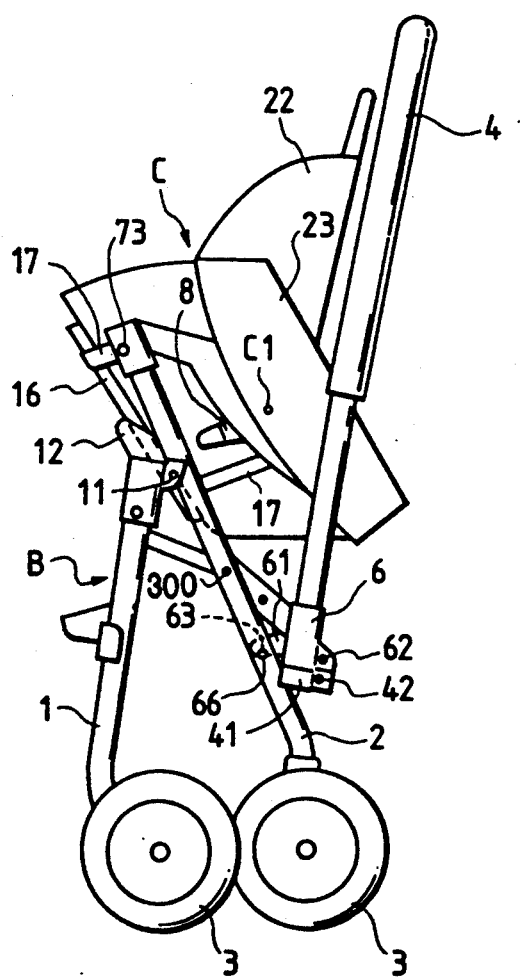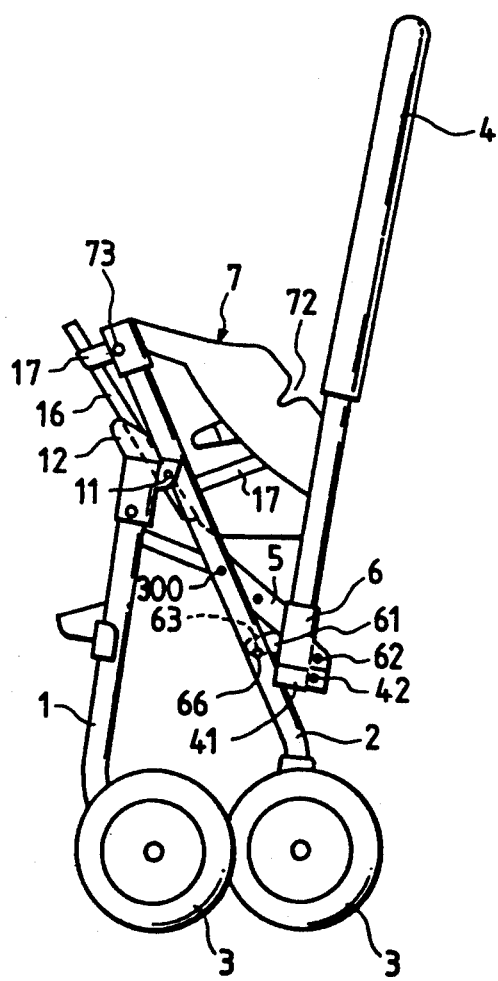

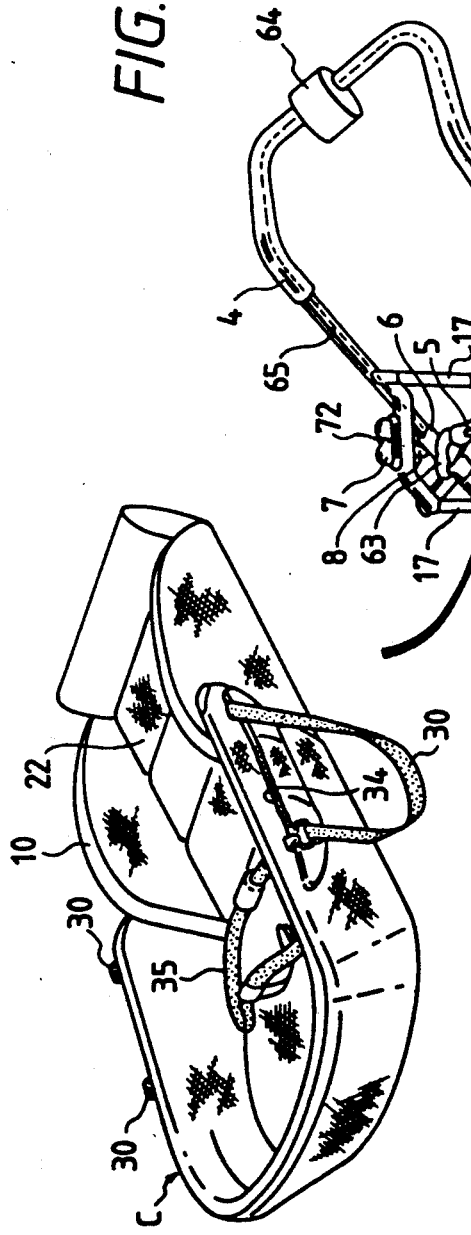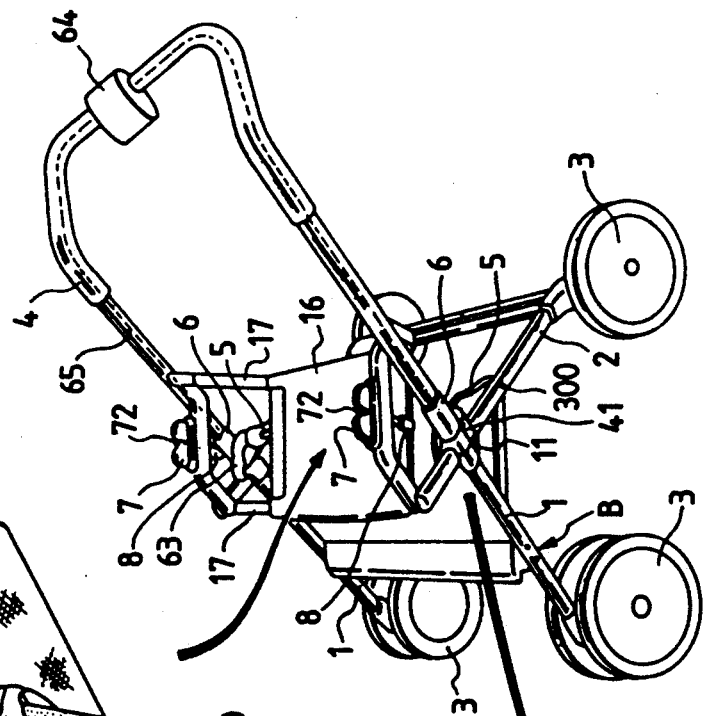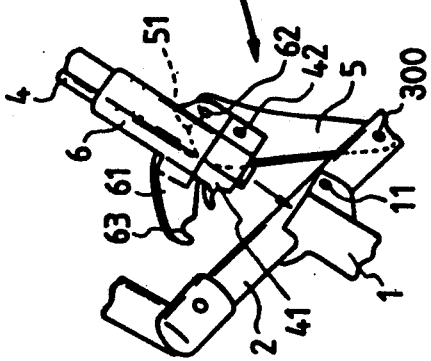

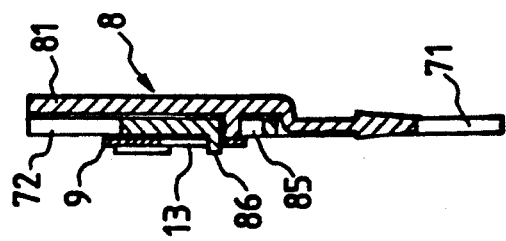
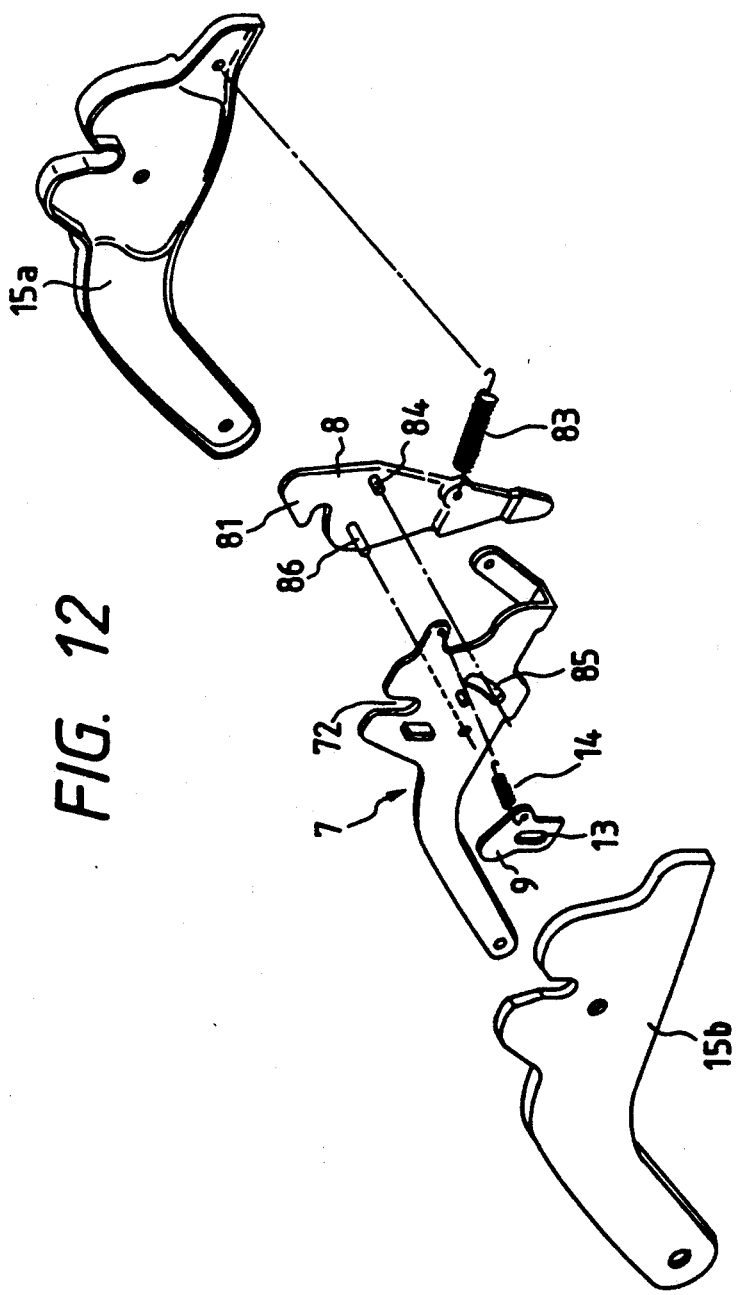

FIG. 22
FIG. 24
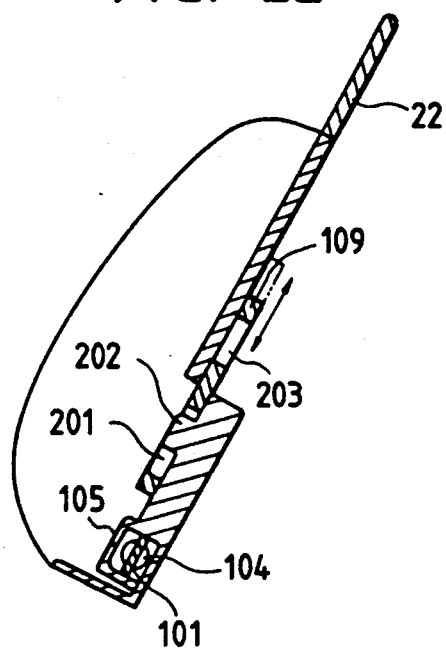
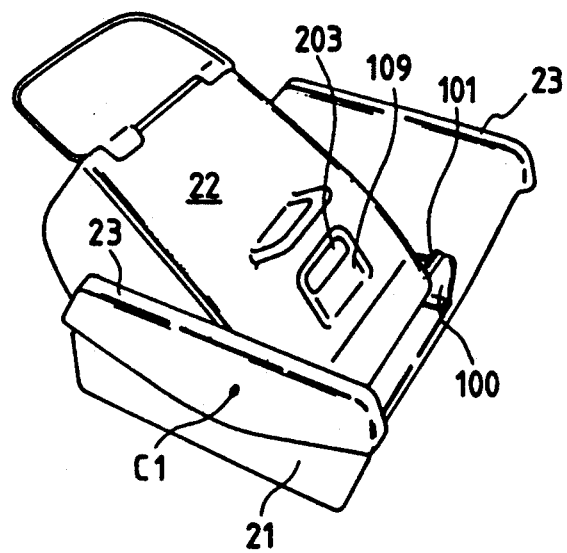
FIG. 23A
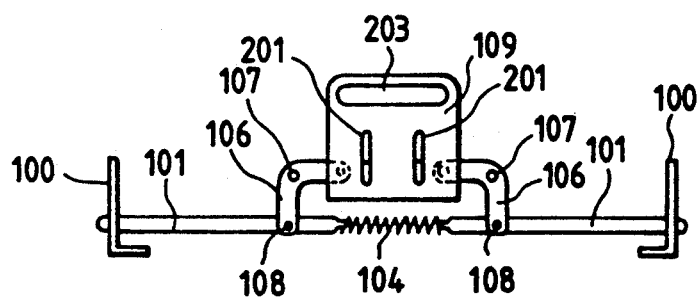
FIG. 23B
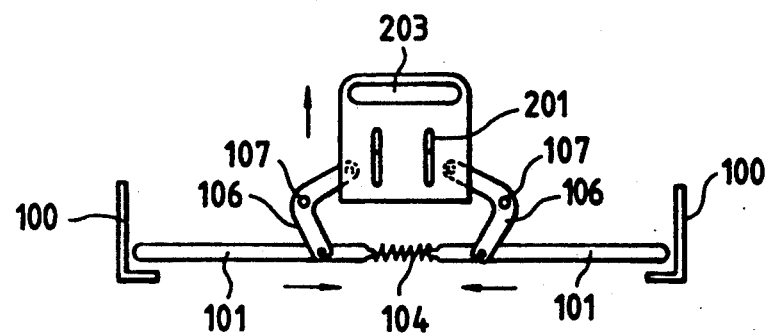

FOLDING STROLLER WITH DETACHABLE SEAT

BACKGROUND OF THE INVENTION

1. Field of the Invention

This invention relates to a folding mechanism for a baby stroller.

2. Description of the Related Art

In conventional baby strollers, a seat and a backrest are formed by a single sheet of cloth, and are classified as types in which the backrest cannot be reclined and the type in which the backrest can be reclined. The type of stroller having a reclining backrest is adapted for use by babies over a wide range of ages. Certain strollers adapted for use by relatively old babies also have a protective frame detachably mounted on the front side of the seat so as to prevent the baby from falling out.

Strollers with reclining backrests, adapted for use by relatively young and small babies, often have a seat that can be freely attached to and detached from the stroller.

In the above-mentioned conventional strollers, the protective frame and the seat are constructed so as to be useful for babies of all ages and sizes. Therefore, the comfort and portability of the seat, is not proper for babies of all ages and sizes.

SUMMARY OF THE INVENTION

The present invention seeks to deal with the above-mentioned problems. It is an object of this invention to provide a folding mechanism for a stroller by which a seat can be freely attached to and detached from the stroller body. The stroller of the invention can be freely folded irrespective of whether the stroller body and the seat are connected together or separated from each other.

Another object of the invention is to provide a folding mechanism for a stroller by which a seat for releasable attachment to a baby-carrying cart body can be reclined, and a protective frame for preventing a baby from falling and a frame for suspending a cover for protecting the legs of the baby can be selectively attached to the front side of the seat.

Accordingly, the present invention is a folding mechanism for a stroller having a foldable body and a seat having a backrest mounted thereon so as to move between a raised position and a reclined position. The seat is detachably retained on the body. The body consists of front leg pipes having wheels at their lower ends and rear leg pipes having wheels at their ends. The front leg pipes are pivotally connected to the rear leg pipes so as to allow folding of the body. A handle is connected to upper ends of the front leg pipes in a continuous manner.

BRIEF DESCRIPTION OF THE DRAWINGS

FIG. 3 is a side-elevational view of the preferred embodiment with the seat in a folded condition;

FIG. 4 is a side-elevational view of the preferred embodiment without the seat in a folded condition;

FIG. 5A is a perspective view of the seat of the preferred embodiment in the condition of FIG. 2;

FIG. 5B is a detailed view of a portion of the cart body;

FIG. 5C is a perspective view of the cart body;

FIG. 12 is an exploded perspective view of the retaining member;

FIG. 13 is a cross-sectional view taken along the line XIII—XIII of FIG. 8;

FIG. 22 is a vertical cross-sectional view through a centerline of the construction of FIG. 20;

FIG. 23(A) is a front-elevational view showing retaining rods as being engaged with and retained on receptive plates respectively;

FIG. 23(B) is a front-elevational view showing the retaining rods as being disengaged respectively from the receptive plates; and FIG. 24 is a perspective view showing the backrest as being folded toward a laid position.

DETAILED DESCRIPTION OF THE PREFERRED EMBODIMENT

A preferred embodiment of the present invention will now be described with reference to the attached drawings.

A stroller according to the preferred embodiment is formed by a combination of foldable body B and seat C (which also serves as a baby carrier) releasably attached to the body.

Figure 2:
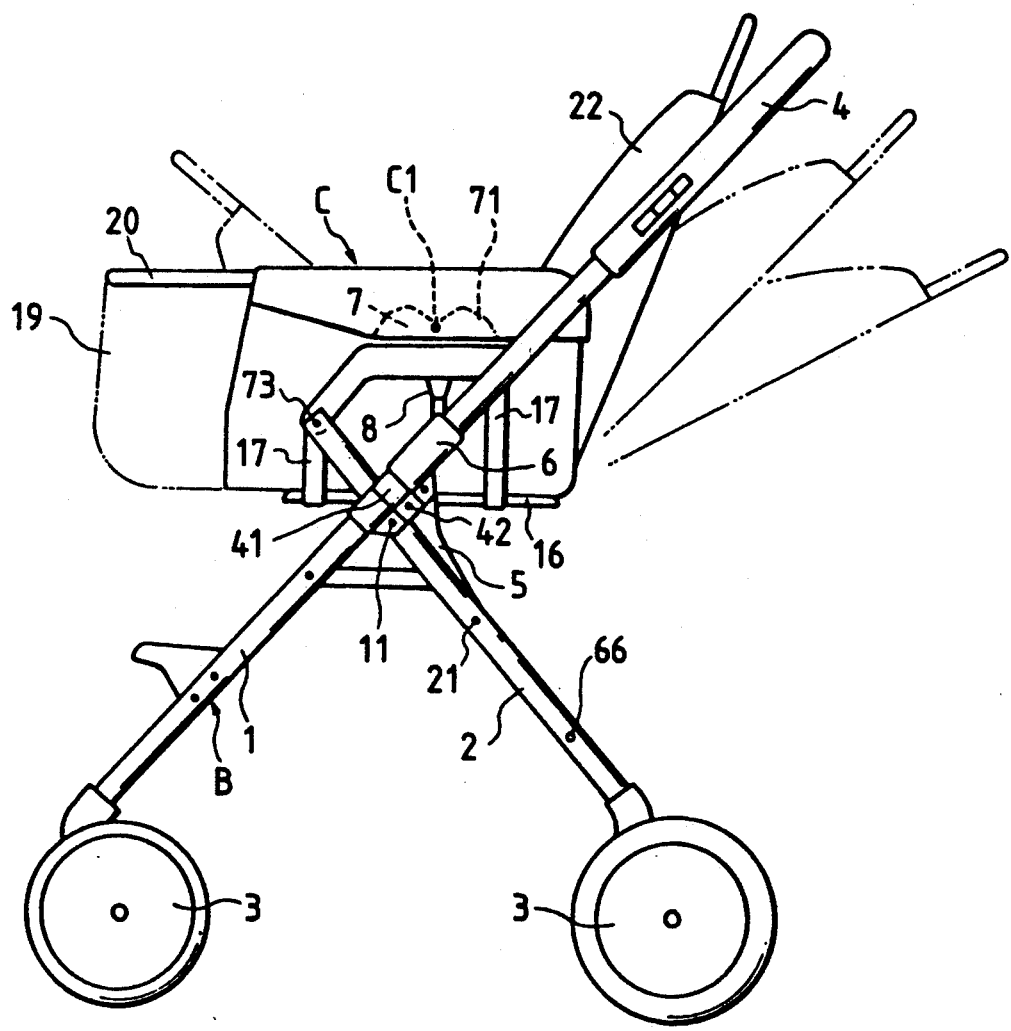
FIG. 2 is a side-elevational view of the preferred embodiment with a suspension pipe attached to the seat.
Figure 6:
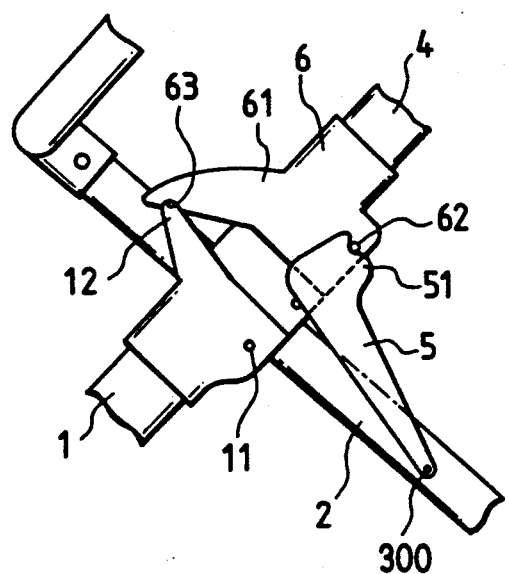
FIG. 6 is a front-elevational view of a retaining portion constituted by a hook receiver and a stopper as seen from the inside of the baby-carrying cart body.

Body B has front leg pipes 1, each having wheels 3 at lower ends thereof, rear leg pipes 2, also having respective wheels 3 at lower ends thereof. Upper end portions of front leg pipes 1 are pivotally connected to upper end portions of rear leg pipes 2 at 11 so as to allow folding of the front and rear leg pipes. Handle 4 is connected to the upper ends of front leg pipes 1 so as to extend along the axes of the front leg pipes 1 thereby providing an appearance in which handle 4 is continuous with front leg pipes 1. Through this construction, body B assumes a general X-shape when viewed from the side (see FIG. 2).

Fold manipulation bracket 5 is pivotally connected at its upper end portion to adapter 41 at pivot point 42. Adapter 41 is fixedly secured to the lower end of handle 4, and the lower end of bracket 5 is pivotally connected at 300, rear leg pipe 2 at a position between the opposite ends of rear leg pipe 2 (see FIGS. 2 and 5 to 7).

Although, in the preferred embodiment, the upper end portion of bracket 5 is pivotally connected at pivot point 42 to adapter 41, which is fixedly attached to the lower end of handle 4, the invention is not limited to such a construction. For example, the upper end portion of bracket 5 may be pivotally connected directly to the lower end portion of handle 4.

Stopper 6 is mounted on the lower end portion of handle 4 for movement upward and downward a small distance along handle 4. Operating wire 65 is extended between stopper 6 and manipulation piece 64, which is rotatably mounted on the upper end portion (handle grip portion) of handle 4 (see dotted line in FIG. 5C). By rotating manipulation piece 64, operating wire 65 is moved up or down so as to move stopper 6 up or down. Accordingly, stopper body 61, fixed to stopper 6, is moved up and down.

Brackets 5 serve to support the lower end portions of handle 4 as well as to maintain the assembled condition of body B. Retaining pin 62, projects slightly from the inner surface of stopper body 61 so as to engage in engaging notch 51 formed in the upper end of bracket 5 (see FIGS. 5 and 6). Retaining hook 63 formed on one end of stopper body 61 is releasably engaged with hook receiver 12 formed on the upper end of front leg pipe 1, so that an assembled condition of the stroller can be maintained (see FIGS. 6 and 7).

FIGS. 8-11 illustrate seat C and how it is mounted to body B. Retaining pieces or members 7 serve to support seat C (which also serves as a separate baby carrier). Retaining member 7 extends between the upper end of rear leg pipe 2 and a portion of handle 4 near the lower end thereof (see FIGS. 2 and 5).

Retaining pin C1 projects from a side surface of seat C and is adapted to be engaged with retaining member 7. Retaining member 7 consists of retaining member body 71 in the form of an elongated plate, lever 8 pivotally connected to the central portion of the inner surface of retaining member body 71, and lock plate 9 vertically movably mounted on the central portion of the outer surface of retaining member body 71.

In the preferred embodiment, lever 8 and lock plate 9 are disposed in opposed relation to each other, with retaining member body 71 interposed therebetween. However, the invention is not limited to this arrangement. For example, both lever 8 and lock plate 9 may be connected to one side of retaining member body 71.

Retaining member body 71 comprises an elongated metal plate of such a length that it can be extended between the upper end of rear leg pipe 2 and a lower portion of handle 4. Formed in the central portion of retaining body 71 is vertically-elongated engaging groove 72 in which retaining pin C1, projecting from the side surface of seat 5C is adapted to be received. Lever 8, pivotally connected to a central portion of the inner surface of retaining member body 71, consists of a vertically-elongated plate-like member having a retaining hook 81 at its upper end. Lever 8 is pivotally connected to retaining member body 71 at position 82 slightly below retaining hook 81.

When retaining pin C1, projected from the side surface of seat C, is fitted in engaging groove 72 formed in retaining member body 71, lever 8 serves to maintain this retaining condition through engagement between retaining pin C1 and retaining hook 81. Lever 8 also serves to forcibly open engaging groove 72.

Figure 10:
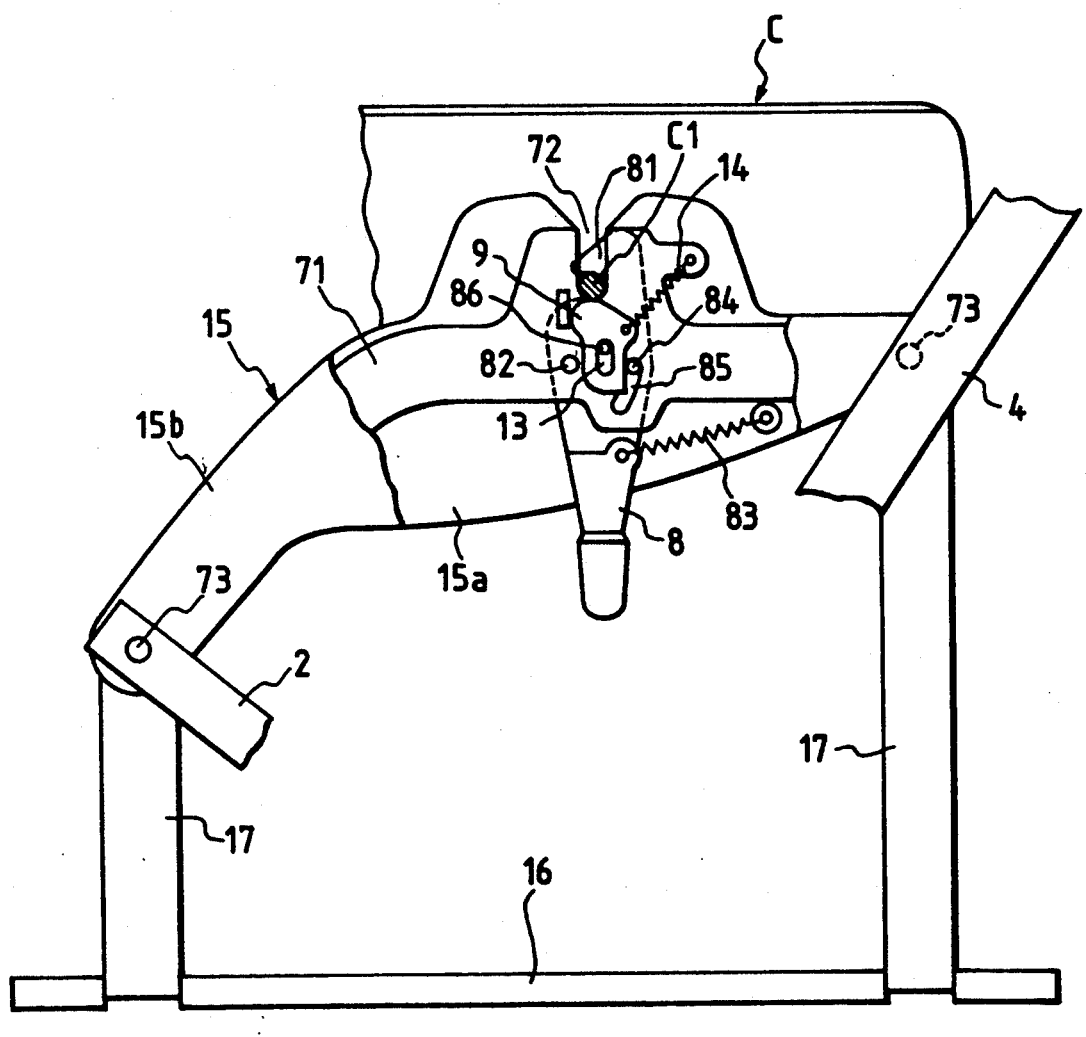
FIG. 10 is a side-elevational view showing a condition in which the engagement of the retaining pin is completed.

Spring 83 extends between the lower end portion of lever 8 and a constituent piece 15a of cover 15 (see FIG. 12). The lower end portion of lever 8 is pulled in the direction of the axis of spring 83 by the force of return spring 83, so that retaining hook 81 is normally held upstanding at a retaining position as illustrated in FIG. 10 (i.e., at the position of engaging groove 72).

Lock pin 84 is formed on lever 8, adjacent to an upper end thereof, and extends through arcuate sliding hole 85 formed through retaining member 7.

Figure 11:
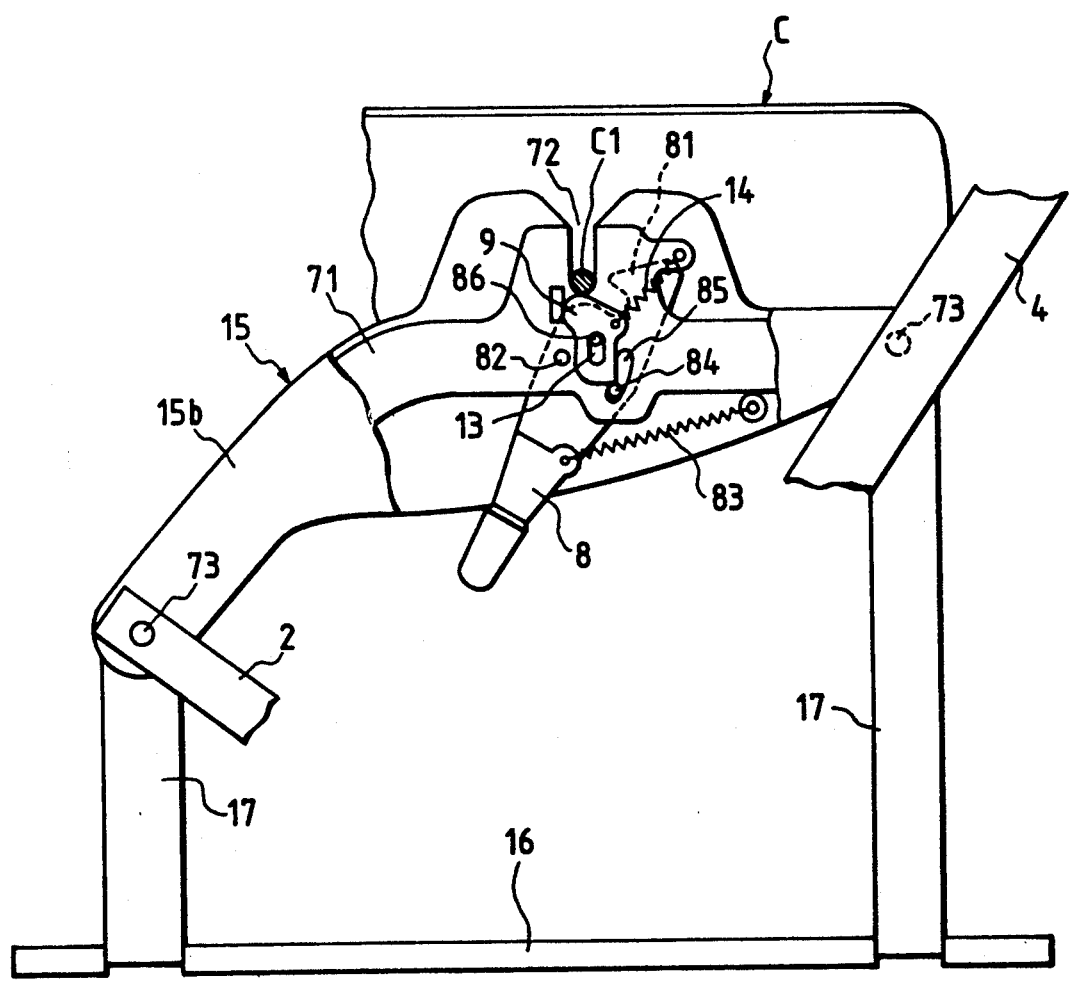
FIG. 11 is a side-elevational view showing a condition in which the distal end portion of the opening/closing manipulation lever is retracted for detaching the seat.
Figure 14A:
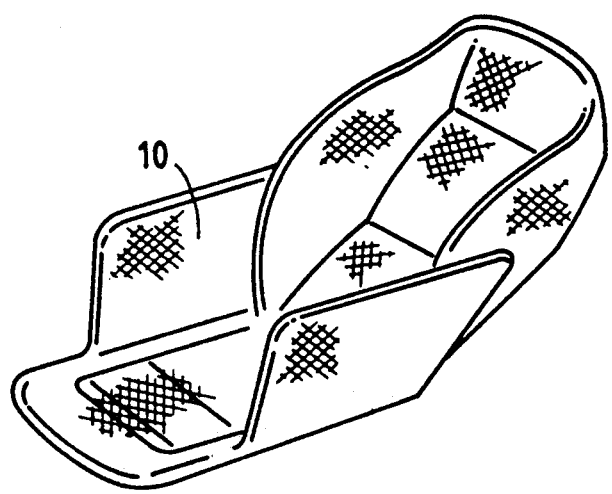
FIG. 14A is a perspective view of the seat cushion in the condition of FIG. 1.
Figure 14B:
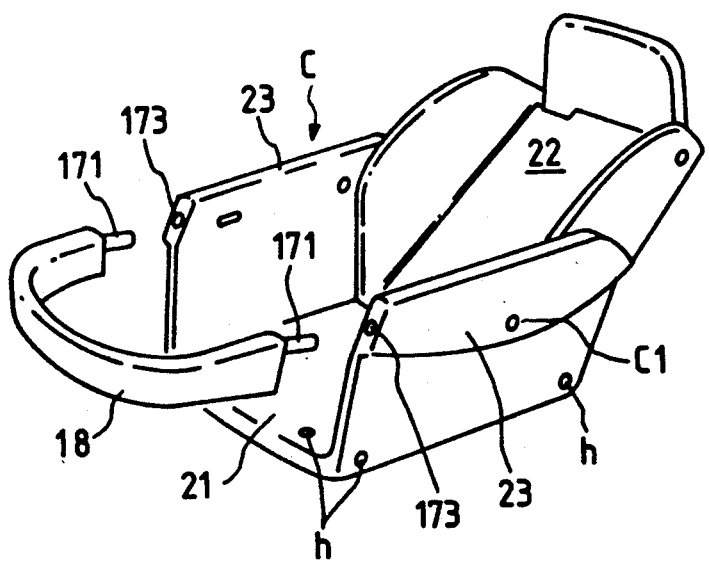
FIG. 14B is a perspective view of the seat of FIG. 1.
Figure 15A:
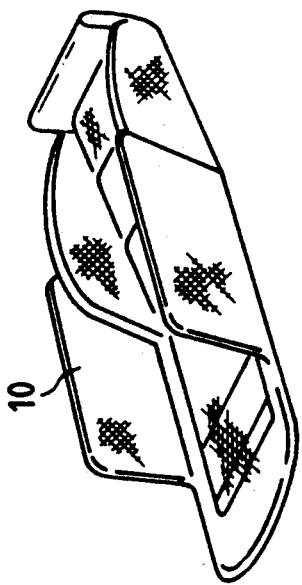
FIG. 15A is a perspective view of the seat cushion in the condition of FIG. 5.
Figure 15B:
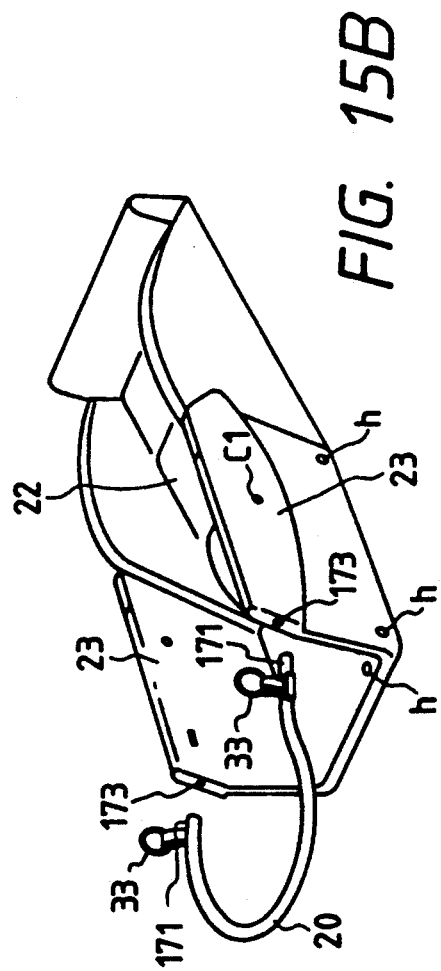
FIG. 15B is a perspective view of the seat in the condition of FIG. 5.
Figure 15C:
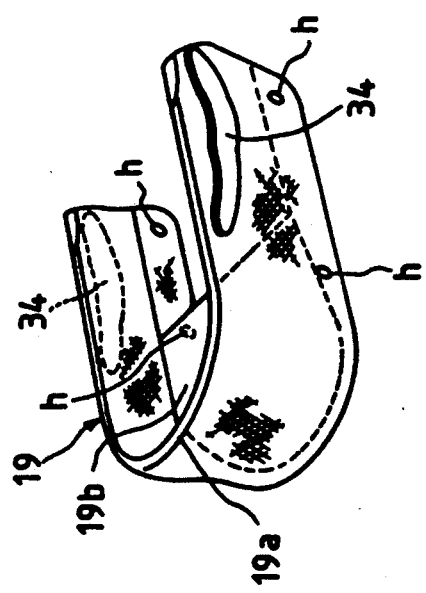
FIG. 15C is a perspective view of the leg cover.

When lever 8 is rotated so as to release the retaining of retaining pin C1 for detaching seat C, lock pin 84 is engaged with the lower end portion of lock plate 9 so as to prevent lever 8 from being returned to its initial position (see FIG. 11).

Lock plate 9 moves upward and downward along engaging groove 72 formed in retaining member body 71. The stroke of this vertical movement is such that when lock plate 9 is at its uppermost position, the upper end portion of lock plate 9 obstructs the lower end portion of engaging groove 72 (see FIGS. 8 and 9). When lock plate 9 is in its lowermost position, the lower end portion of engaging groove 72 is opened (see FIGS. 10 and 11).

Sliding hole 13 is formed through the central portion of lock plate 9, and guide pin 86, extending from the side surface of retaining member body 71, is received in sliding hole 13 to thereby ensure an accurate vertical movement of the lock plate. Return spring 14 extends between the upper end portion of lock plate 9 and the upper end portion of retaining member body 71 to bias lock plate 9 upward toward its original position.

Cover 15 covers retaining member 7, and consists of two pieces 15a and 15b which cover retaining member 7 from opposite sides so as to prevent various problems associated with the exposure of the constituent parts of retaining member 7. Additionally, cover 15 adds to the appearance of the invention. Grooves and holes necessary for operation of retaining member 7 are, of course, provided at upper and lower surfaces of cover 15.

Support plate 16 serves to support the lower surface of seat C. Suspension pipes 17, upstanding from end portions of support plate 16, are pivotally connected at their upper ends to opposite ends of retaining members 7 by pivot pins 73 (see FIGS. 8 to 11).

Pivot pins 73 also serve to pivotally connect the opposite ends of each retaining member body 71 to the upper end of rear leg pipe 2 and the lower end portion of handle 4.

By the use of support plate 16, even when a relatively large force is applied to seat C, it can be stably supported by retaining members 7 and support plate 16.

FIGS. 14A-24 illustrate seat C. Seat C consists of seat portion 21 and backrest portion 22 pivotally connected to the rear end of seat portion 21 so as to move between a raised position and a reclined position. Retaining pins C1 projected from the opposite sides of seat portion 21 are engaged respectively in engaging grooves 72 formed respectively in retaining members 7. The lower surface of seat portion 21 is supported by support plate 16 formed on body B. Guard frame 18 or pipe 20 for suspending leg cover 19 is releasably attached to front ends of armrests 23 upstanding from opposite side portions of seat portion 21 (see FIGS. 14B and 15).

Figure 16A:
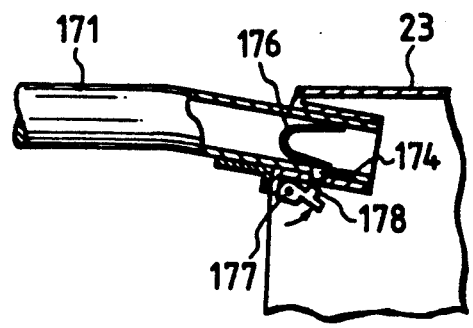
FIGS. 16(A), 16(B) and 16(C) are fragmentary, enlarged cross-sectional views showing the process of detaching a guard frame from an armrest.
Figure 16B:
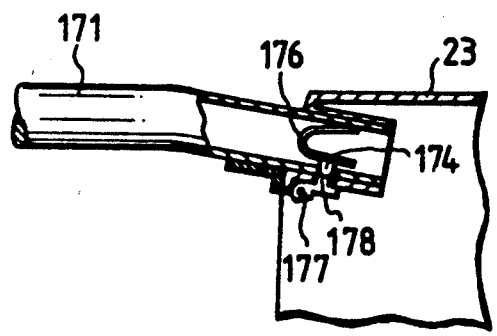
Figure 16C:
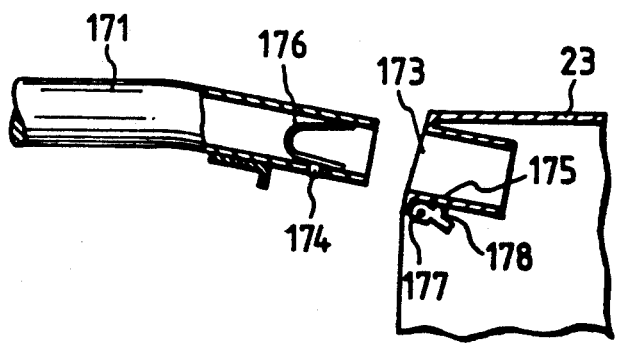
Figure 17:
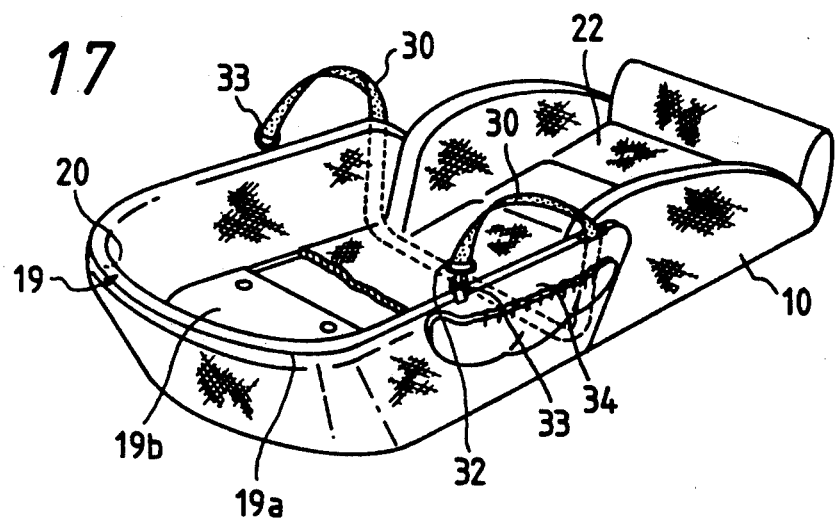
FIG. 17 is a partly-broken, perspective view showing the seat as being used as a baby carrier.
Figure 18:
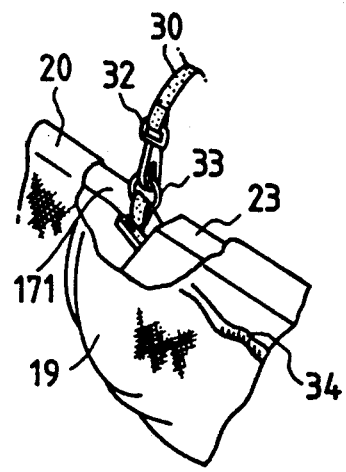
FIG. 18 is an enlarged perspective view of a carrier belt-attaching portion of FIG. 17.
Figure 19:
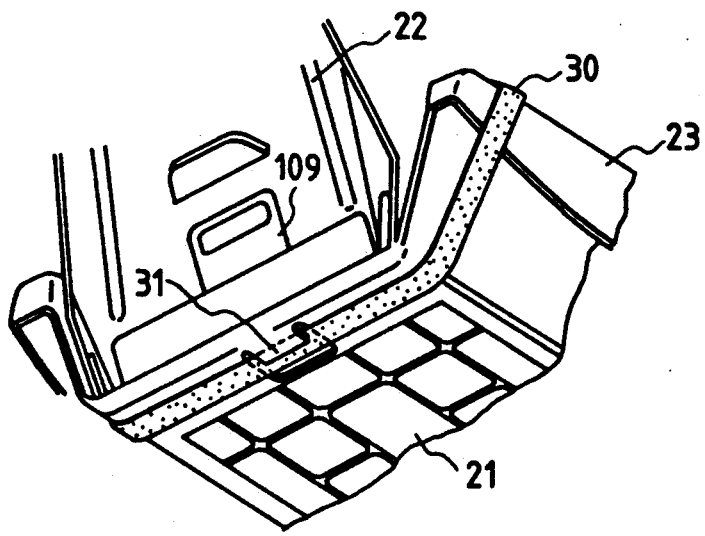
FIG. 19 is a perspective view showing the retaining of the carrier belt to the lower surface of the seat, as seen from the bottom.

FIGS. 16(A), 16(B), and 16(C) show a construction in which mounting pipe 171, formed at each of the opposite end portions of guard frame 18 or suspension pipe 20 for leg cover 19, is fitted in fitting hole portion 173 formed in armrest 23. Retaining projection 174 is retractably projected radially from the end portion of mounting pipe 171. When mounting pipe 171 is fitted in fitting hole portion 173 in armrest 23, retaining projection 174 is engaged in retaining hole 175 formed in fitting hole portion 173.

Spring plate 176 resiliently supports the reverse side of retaining projection 174, and is bent into a U-shape and is mounted within the end portion of mounting pipe 171 to thereby bias retaining projection 174 from the reverse side thereof. Release member 177 is pivotally mounted on the lower surface of fitting hole portion 173, and operating projection 178 formed on release member 177 is fitted into retaining hole 175 from below so as to force retaining projection 174 out of retaining hole 175.

Seat C has seat cushion 10 covering seat portion 21 and backrest 22. The lower half of seat cushion 10 covers the upper surface of seat portion 21 and the inner sides of armrests 23. The upper half of seat cushion 10 covers the front surface of backrest 22 and side walls upstanding respectively from the opposite sides of backrest 22. The front end of seat cushion 10 extends into leg cover 19 so that the legs of the baby can be supported, in a cushioned manner, inside leg cover 19.

Leg cover 19 serves to cover the legs of the baby projecting from seat portion 21, when the baby is reclined. Leg cover 19 is formed by bending a strip of cloth into an inverted U-shape as viewed from above (the cloth has the same height as that of armrest 23). The upper edge portion of the U-shaped cloth strip serves as retaining portion 19a for suspension pipe 20 and armrests 23. Footrest portion 19b of a semicircular shape is integrally connected to the lower end of the front half of the U-shaped cloth strip to close the lower side of leg cover 19. After leg cover 19 is mounted to cover armrests 23, the opposite end portions of leg cover 19 are retained on the side surfaces of armrests 23 by retaining fasteners h, or the like.

When seat C is utilized as a baby carrier, carrier belt 30 is attached thereto. Belt 30 is retained at its central portion on the lower surface of seat portion 21, and then the opposite ends of this belt are retained respectively on opposite ends of suspension pipe 20 (see FIG. 17). Belt retaining portion 31 is formed at the lower surface of seat portion 21 adjacent to the rear end thereof. The central portion of belt 30 is engaged in retaining portion 31 to secure belt 30 (see FIG. 19). Retaining member 32 is secured to each of the opposite ends of belt 30, and is releasably attached to retaining metal ring 33 secured to each end of suspension pipe 20 (see FIG. 18).

Pocket 34 is provided on each of the opposite side surfaces of leg cover 19. Carrier belt 30 can be folded and is accommodated within pocket 34 when not in use. Safety belt 35 for holding the baby is attached to seat portion 21 (see FIG. 5).

Figure 20:
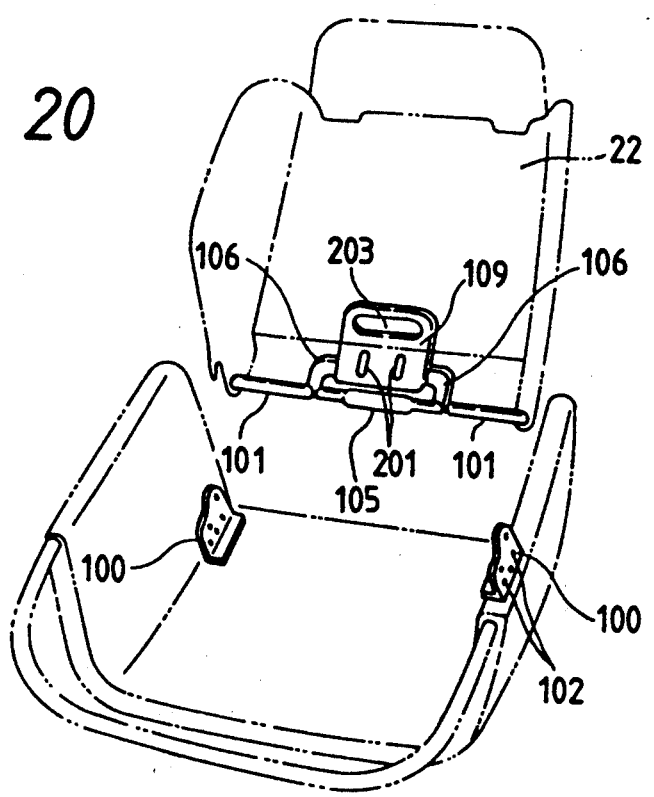
FIG. 20 is a perspective view showing the mounting of a reclining mechanism on the seat.
Figure 21:
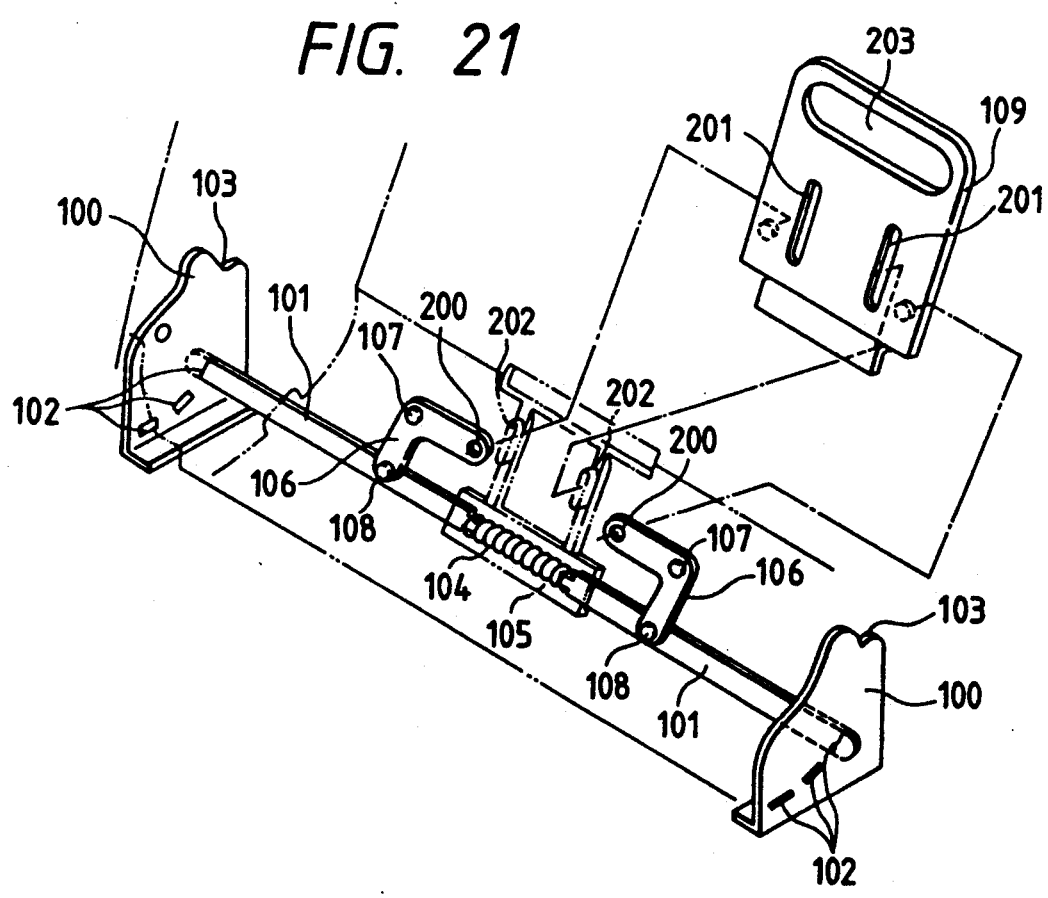
FIG. 21 is a partly-exposed, enlarged perspective view of important portions of the construction of FIG. 20.

FIG. 20 illustrates the reclining mechanism. Two retaining rods 101 are provided at the lower end of backrest 22 so as to reciprocally move in the direction of the width of backrest 22. The outer end of each of the two retaining rods 101 is adapted to be selectively fitted in one of a plurality of reclining holes 102 formed through receptive plate 100 upstanding from each of the opposite sides of seat portion 21, or folding notch 103 in receptive plates 100. Push spring 104 extends between the inner ends of the two retaining rods 101, and is received in casing 105 in compressed condition, so as to bias retaining rods 101 outward (toward retaining positions).

Operating links 106 serve to move retaining rods 101. The bent portion of each operating link 106 is pivotally connected at pivot 107, to backrest 22. The portion of operating link 106 below pivot 107 is pivotally connected at 108 to the inner end portion of retaining rod 101. The portion of operating link 106 above pivot 107 is pivotally connected at 200 to swing operating plate 109.

Swing operating plate 109 is fixedly mounted on the lower end portion of backrest 22 so as to move upward and downward, and guide projections 202 formed on backrest 22 are fitted respectively in elongated fitting holes 201 formed through swing operating plate 109, so as to ensure accurate vertical movement of plate 109. Operating hole 203 is formed through the upper end portion of swing operating plate 109, which can be grasped by the operator when moving swing operating plate 109 upward and downward.

Backrest 22 can be freely inclined by adjusting its upstanding angle. When backrest 22 is not used (particularly when it is folded together with the stroller), the backrest can be laid toward seat portion 21 to make the folded condition more compact (see FIGS. 3 and 4).

Use of the preferred embodiment will be described below. Before seat C is attached to stroller B, each retaining member 7 is in the condition shown in FIG. 8. Namely, lever 8 is upstanding relative to retaining member body 71 by the force of return spring 83, and retaining hook 81 obstructs the lower end portion of engaging groove 72. Also, lock plate 9 is raised along engaging groove 72 by the force of return spring 14.

When seat C is to be retained on retaining members 7, the opposite sides of seat portion 21 are held by the operator and retaining pins C1 are fitted respectively in engaging grooves 72 formed in retaining members 7. Retaining pin C1 descends, and is abutted against the head of the retaining hook 81 on the upper end portion of lever 8. When retaining pin C1 further descends, the head of retaining hook 81 is forcibly displaced laterally, as indicated by a dotted line in FIG. 9.

When retaining pin C1 descends further, retaining pin C1 is abutted against the upper end portion of lock plate 9 provided at the opposite side of engaging groove 72 (that is, the side facing away from lever 8), so as to press down lock plate 9, until retaining pin C1 reaches the lower end of engaging groove 72.

When retaining pin C1 reaches the lower end of engaging groove 72, the urging force applied to retaining hook 81 during descent of retaining pin C1 is released, so that lever 8 is returned to its upstanding position.

Accordingly, retaining pin C1 is prevented from becoming disengaged from engaging groove 72 (see FIG. 10). Thus, the attachment of seat C to body B is completed, and the mode of use of the baby-carrying cart can be selected. Part of the lower end portion of lock plate 9 pressed down by descent of retaining pin C1 is projected so as to close part of sliding groove 85 (in which lock pin 84 is received) adjacent to the lower end of this groove (FIG. 10).

Before backrest 22 of seat C retained on the baby-carrying cart body B is inclined, or before backrest 22 is folded (that is, inclined toward seat portion 21 for folding purposes), the outer end of each of retaining rods 101 is either received in one of reclining holes 102 or retained in folding notch 103. With this arrangement, the upstanding condition or the folding condition (the laid condition) of backrest 22 is maintained (see FIG. 23(A)).

When backrest 22 is to be inclined, or folded, the upper end portion (operating hole 203) of swing operating plate 109 exposed at the rear surface of backrest 22 is gripped and is pulled upward. When swing operating plate 109 is moved upward by the above operation, the upper end portions of operating links 106 are lifted so as to cause the lower end portions of operating links 106 to be moved inwardly (toward spring 104). Therefore, the outer ends of operating links 106 are retracted, so that each of retaining rods 101 becomes disengaged from reclining hole 102 or folding notch 103 (see FIG. 23(B)).

When the distal end of each of retaining rods 101 is disengaged from reclining hole 102 or folding notch 103, backrest 22 is no longer maintained in the upstanding condition (or the laid condition). Accordingly, backrest 22 can now be moved to another position where operating plate 109 is released so that retaining rods 101 are again urged outwardly by the urging force of spring 104.

In the above condition, the distal end of retaining rod 101 is merely abutted against the surface of receptive plate 100. Therefore, when backrest 22 is swingingly moved, the reclining mechanism mounted at the lower end portion of backrest 22 is also swingingly moved, and when the distal end of each of retaining rods 101 is brought into registry with reclining hole 102 or folding notch 103 during this swinging movement, the distal end is engaged therein so as to be retained.

For example, when it is desired to move backrest 22 from the upstanding position to the completely folded position or vice versa, backrest 22 is moved to the desired position without releasing the lifting of swing operating plate 109, and then is released at this desired position, thereby effecting the same retaining as described above.

When seat C is to be detached, the lower end portion of each lever 8 in the retaining condition shown in FIG. 10 is swingingly moved left (FIG. 10) against the bias of return spring 83. When lever 8 is moved, lock pin 84 received in the sliding groove 85 moves downward along sliding groove 85.

As shown in FIG. 10, part of the lower end portion of lock plate 9 pressed down by retaining pin C1 is projected so as to close part of sliding groove 85. Therefore, when lock pin 84 is moved downward by lever 8, lock pin 84 urges this projected portion aside. When lock pin 84 moves to the lower end of sliding groove 85, the urging against lock plate 9 is released, so that the lower end portion of lock plate 9 is returned to the initial position under the force of return spring 14.

In this condition, when lever 8 is released, it tends to return to the initial position under the force of spring 83. However, since the upper portion of lock pin 84 is retained by the lower surface of lock plate 9, the swinging movement of lever 8 is prevented, so that retaining pin C1 remains unsecured. As a result, seat C can be detached (see FIG. 11).

Figure 9:
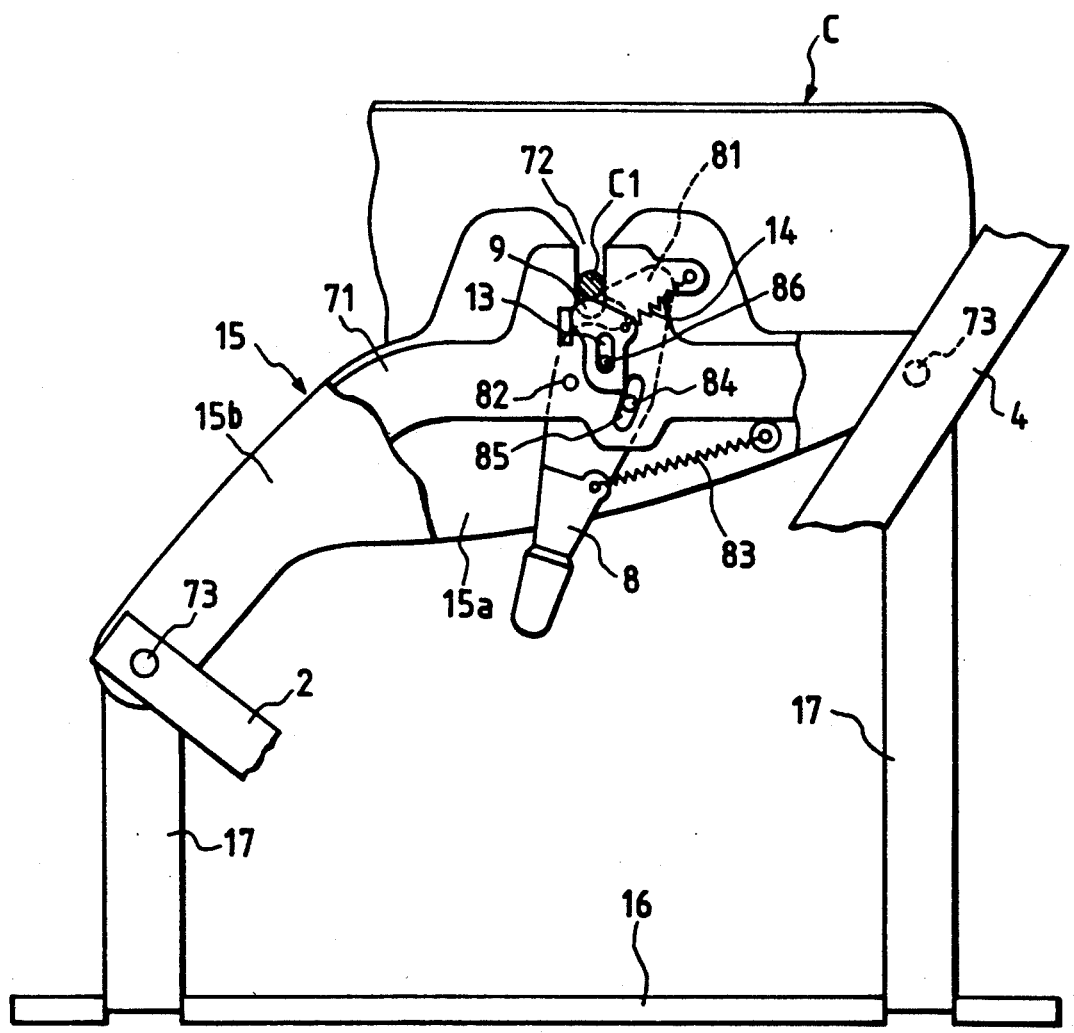
FIG. 9 is a side-elevational view showing a condition in which a retaining hook formed on an upper end portion of a lever is inclined rearwardly by the engagement of the retaining pin.

When seat C is detached from retaining members 7, the urging of retaining pin C1 against lock plate 9 is released, so that lock plate 9 can move upward. When lock plate 9 moves upward, the retaining of lock pin 84 by the lower surface of lock plate 9 is also released, and lever 8 is returned into the upright position, as shown in FIG. 9, and is ready for subsequent use.

Figure 1:
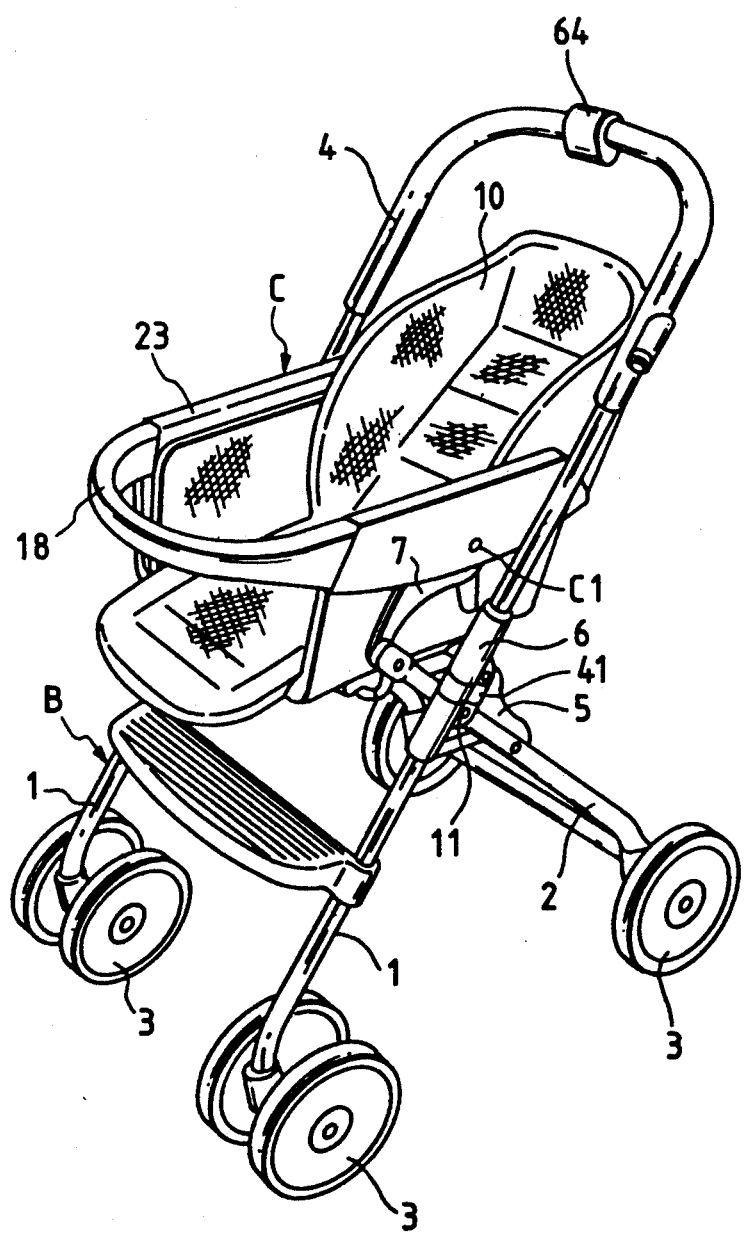
FIG. 1 is a perspective view of the preferred embodiment with a guard frame attached to a seat.

Guard frame 18 can be attached to C in order to protect the baby's legs. Guard frame 18, generally used when the baby is relatively old, is attached to the front ends of armrests 23, and the baby is seated on seat C (see FIGS. 1 and 14B). The attachment of guard frame 18 to armrests 23 can be achieved merely by inserting mounting pipes 171, of guard frame 18 into fitting hole portions 173 of armrest 23. Retaining projection 174, on a distal end portion of mounting pipe 171, engages in retaining hole 175 in fitting hole portion 173, thereby preventing the removal of mounting pipe 171 and securing guard frame 18 to armrest 23 (see FIG. 16(A)).

When guard frame 18 is to be removed, operating projection 178 of release member 177 is inserted from below fitting hole portion 173, so that retaining projection 174, on mounting pipe 171, is disengaged from fitting hole portion 173. As a result, mounting pipe 171 can be easily withdrawn from fitting hole portion 173 (see FIGS. 16(A) and 16(B)). When guard frame 18 is used, leg cover 19 for covering the front side of seat C does not need to be used. Therefore it is only necessary to use seat cushion 10 which covers seat portion 21 and backrest 22.

For younger babies normally laid on seat C in a reclined condition, backrest 22 is fully reclined. Suspension pipe 20 is attached to the front ends of armrests 23 in a manner similar to that of guard frame 18. When suspension pipe 20 is to be used, it is desirable to protect the legs of the baby laid on seat C. Therefore, leg cover 19 is used in combination with seat cushion 10 as described above.

Leg cover 19 is retained on suspension pipe 20 at the upper edge portion of the distal end portion thereof, and the portion of leg cover 19 disposed forwardly of the distal end portion thereof is retained on the side surfaces of armrests 23. In this case, the distal end portion of seat cushion 10 is placed on the upper surface of footrest portion 19b. Those portions of carrier belt 30 exposed at the side surfaces of seat C are folded and accommodated within pockets 34 provided on leg cover 19.

Another method of accommodating carrier belt 30 may also be used, in which retaining members 32 are disengaged from retaining rings 33, and then the opposite end portions of carrier belt 30 are folded and accommodated in pockets 34. In either case, the central portion of carrier belt 30 remains retained on belt retaining portion 31 provided at the lower surface of seat portion 21.

When seat C is to be used as a baby carrier, carrier belt 30, folded and received in pockets 34, is taken out and adjusted to a length suited for carrying purposes. If retaining metal members 32 are disengaged from retaining rings 33, they are connected together, and then the length of carrier belt 30 is adjusted appropriately. Then, retaining pins C1 are disengaged respectively from retaining members 7 provided on body B as described above.

Seat C, when disengaged from body B can be used as a baby carrier by holding those portions of carrier belt 30 provided at the side surfaces of seat C. In such a case, by adjusting the length of carrier belt 30, seat C can be either supported by the user's shoulder, or held by the hand. Backrest 22 of seat C can now be reclined if desired, depending on the age of the baby. When body B, from which seat C has been disengaged, is to be folded, manipulation piece 64 mounted on handle 4 is rotated, so that stoppers 6 are moved upward along handle 4.

Figure 7:
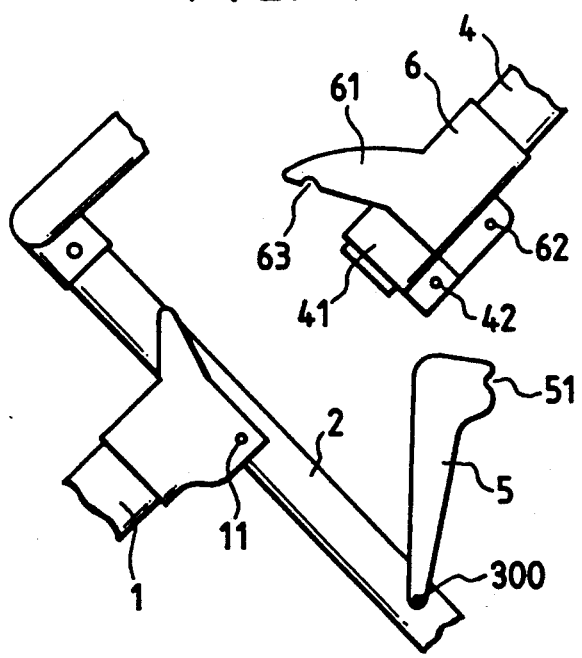
FIG. 7 is a front-elevational view of the construction of FIG. 6, showing the parts separated from each other.
Figure 8:
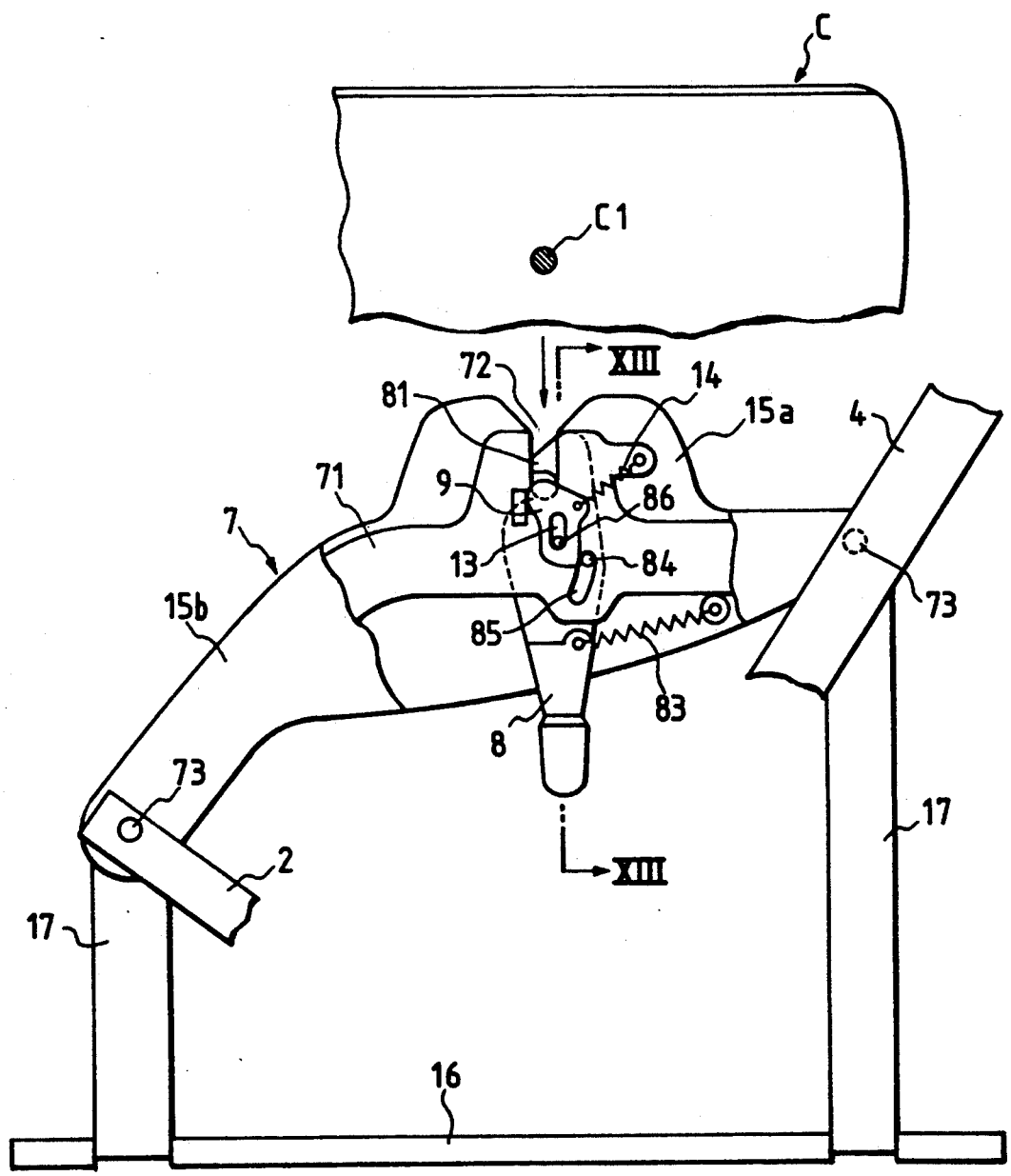
FIG. 8 is a side-elevational view of the retaining member, showing a condition immediately before a retaining pin of the seat is engaged.

When each stopper 6 is moved upward, retaining hook 63 formed on one end of stopper body 61 is disengaged from hook receiver 12, provided at the upper end portion of rear leg pipe 2, and at the same time retaining pin 62, projected from stopper body 61, is disengaged from engaging groove 51 formed in the upper end portion of bracket 5 (see FIGS. 5 and 7).

When retaining hook 63, as well as retaining pin 62 is released, handle 4, while being guided by brackets 5, is folded downward toward the rear side of rear leg pipes 2. In concert with the folding of handle 4, the mating front and rear leg pipes 1 and 2 are folded with their lower ends moving toward each other, and finally the condition shown in FIG. 4 is obtained.

When body B is folded by the above operation, retaining hook 63 provided on stopper 6 is automatically engaged with retaining pin 66 formed on the lower end portion of rear leg pipe 2, so as to maintain a folded condition. The stroller can also be folded when seat C is attached. First, seat C is folded by gripping operating plate 109, exposed at the rear side of backrest 22, and is pulled upward. By doing so, swing operating plate 109 is moved upward, so that the upper end portions of operating links 106 are lifted.

When the upper end portions of L-shaped operating lings 106 are lifted, the lower end portions thereof are moved inward toward spring 104, so that the outer end portions of operating links 106 are retracted. As a result, the engagement of each retaining rod 101 in reclining hole 102 is released (see FIG. 23 (B)).

When the distal ends of retaining rods 101 are disengaged from reclining holes 102, backrest 22 is no longer maintained in the upstanding condition and can be folded against seat portion 21. When swing operating plate 109 is released, retaining rods 101 are again urged outward by the resilient force of push spring 104.

In the above condition, the distal end of retaining rod 101 is brought into registry with folding notch 103 so that the compact folding condition of seat C can be maintained (see FIG. 24). In this condition, when stroller body B folding operation described above is carried out, body B, including seat C, can be folded into a compact condition (see FIG. 3).

The advantages of the present invention of the above construction are as follows:

(1) Body B and seat C, for supporting the baby, are formed as separate structures, and they can be connected together integrally and separated from each other according to need. Therefore, the stroller can, of course, be used in a conventional manner or seat C can be detached and used as a baby carrier.

(2) Body B and seat C are detachable from each other, and seat C itself can be folded into a compact form. With this construction, even when seat C is attached to body B, the overall structure can be folded into a compact condition. Further, body B itself, can be folded into a compact form.

(3) Seat C of the preferred embodiment can be reclined, or folded into itself. Accordingly, when body B is to be folded, the folding can be carried out with backrest 22 not kept upstanding, and therefore the requirement for compactness can be fully met.

(4) Guard frame 18 and suspension pipe 20 can be selectively attached to the front side of seat C. When suspension pipe 20 is to be used, leg cover 19 can also be used. Therefore, the stroller can be used for babies of a wide range of ages, from relatively older and larger babies who can be seated on seat portion 21 to younger babies who need to be laid on seat portion 21.

(5) Regardless of whether guard frame 18 or suspension pipe 20 is attached to seat C, it can be folded into a compact form.

What is claimed is:

1. A folding stroller, comprising:
   a foldable body, said body comprising;
   at least two front leg pipes with wheels at lower ends thereof;
   at least two rear leg pipes with wheels at lower ends thereof;
   upper end portions of said front leg pipes are pivotally connected to upper end portions of a respective one of said rear leg pipes;
   a handle having lower ends which are connected to respective upper ends of said front leg pipes, said handle extending essentially along a longitudinal axis of said front leg pipes when said body is in an unfolded position; and
   a bracket pivotally mounted to each lower end of said handle and a respective one of said rear leg pipes so as to cause said body to assume a shape wherein said rear leg pipes and respective ones of said front leg pipes intersect at a predetermined angle when said body is in said unfolded position;
   a seat having a backrest and a seat portion that are swingably attached to each other, at a hinge, so as to allow said backrest to be folded onto said seat portion or reclined respective to said seat portion; and
   a retaining piece pivotally mounted on said body so as to extend between said upper end portions of said rear leg pipes and lower end portions of said handle, said retaining piece having a recessed portion formed therein, a portion of said seat fitting in said recessed portion, said retaining piece having a closing lever pivotally mounted thereon, said closing lever closes said recessed portion so as to retain said portion of said seat in said recessed portion when said closing lever is pivoted to a closed position.

2. A folding stroller according to claim 1, further comprising:
   a carrying handle attached to said seat so as to allow said seat to operate as a carrying device when said seat is detached from said foldable body.

3. A folding stroller according to claim 1, wherein said handle is connected to said front leg pipes by a collar that is slidably fitted over upper ends of said front leg pipes and said lower ends of said handle when said body is unfolded, said collar is slidable along said handle in a direction away from said upper ends so as to not extend over said upper ends when said body is to be folded.

4. A folding stroller, comprising:

a foldable body, said body comprising:
  at least two front leg pipes having wheels at lower ends thereof;
  at least two rear leg pipes having wheels at lower ends thereof, upper end portions of said front leg pipes being pivotally connected to upper end portions of a respective one of said rear leg pipes;
  a handle having lower ends which are connected to respective upper ends of said front leg pipes, said handle extending essentially along a longitudinal axis of said front leg pipes when said body is in an unfolded position;
  a bracket pivotally mounted to each lower end of said handle and a respective one of said rear leg pipes so as to cause said body to assume a shape wherein said rear leg pipes and respective ones of said front leg pipes intersect at a predetermined angle when said body is in an unfolded position; and
  at least one retaining piece pivotally mounted on said body so as to extend between said upper end portions of said rear leg pipes and lower end portions of said handle; and
  a seat having a backrest and a seat portion that are swingably attached to each other, at a hinge, so as to allow said backrest to be folded onto said seat portion or reclined respective to said seat portion, said seat having at least one retaining pin projecting therefrom which is adapted to be received in receiving means formed on said retaining piece, each of said at least one retaining pins being detachably retained by a retaining means movably mounted on each of said at least one retaining pieces when said seat is attached to said body.

5. A folding stroller according to claims 1 or 4 in which said backrest can be freely rotated about said hinge.

6. A folding stroller according to claims 1 or 4, further comprising:
  a support plate attached to said body, for supporting a lower surface of said seat portion, extending between a pair of structures, each of said structures comprising one of said front leg pipes, and a corresponding one of said rear leg pipes.

7. A folding stroller according to claim 6, wherein said support plate is pivotally connected to said retaining pieces by suspension pipes upstanding from opposite ends of said support plate.

8. A folding stroller according to claims 1 or 4 further comprising:
  a rigid guard releasably attached to a front side of said seat so as to project therefrom for protecting the legs of a child placed in the stroller.

9. A folding stroller according to claims 1 or 4, further comprising:
  a frame releasably attached to a front side of said seat so as to project therefrom;
  a flexible leg cover for providing further protection to the child, said leg cover being supported by said frame.

10. A folding stroller according to claim 9, wherein said leg cover is a strip of cloth supported in a U-shape, by said frame as viewed from above, said strip having a height substantially equal to a height of armrests provided on said seat;
  an upper edge portion of said strip serves as a retaining portion for retaining said strip to said frame; and
  a footrest portion having a semi-circular shape, connected to a lower end of a front portion of said strip so as to close a lower portion of said leg cover.

* * * * *